Feb. 5, 1924.                                              1,482,461
                          F. DIEHL
                       BELT COUPLING
                     Filed June 15, 1922

WITNESSES:                                        INVENTOR
Adrian DeMan.                                   Frederick Diehl
John F. Heine                                   BY Henry J. Miller
                                                      ATTORNEY Patented Feb. 5, 1924.

1,482,461

UNITED STATES PATENT OFFICE.

FREDERICK DIEHL, OF ELIZABETH, NEW JERSEY, ASSIGNOR TO DIEHL MANUFACTURING COMPANY, OF ELIZABETH, NEW JERSEY, A CORPORATION OF NEW JERSEY.

BELT COUPLING.

Application filed June 15, 1922. Serial No. 568,541.

*To all whom it may concern:*

Be it known that I, FREDERICK DIEHL, a citizen of the United States, residing at Elizabeth, in the county of Union and State of New Jersey, have invented certain new and useful Improvements in Belt Couplings, of which the following is a specification, reference being had therein to the accompanying drawings.

This invention has for an object to provide a strong, durable, inexpensive and easily applied coupling which is particularly adapted for round belting of small size and which will allow the belt to run smoothly, quietly and efficiently over a pulley having a relatively short radius of curvature, without unduly weakening or shortening the life of the belt.

Another object of the invention is to provide an inexpensive, durable and efficient endless belt of round section particularly adapted for driving a sewing machine from a motor-attachment.

To the attainment of the ends in view, the coupling is preferably made up in the form of a two-part device comprising a U-shaped member the body and legs of which are of less width than the belt. Said member is preferably bent up from a strip of metal, and its legs are passed respectively through the belt ends and a holding or clinch-plate perforated at its opposite ends to fit over said legs and extend across the meeting line at the juncture of the belt-ends at the outer side or non-pulley-contacting surface of the belt. The ends of the legs of the U-shaped member projecting beyond the holding plate are bent toward the center of the plate and may be further secured by soldering.

Figure 1:
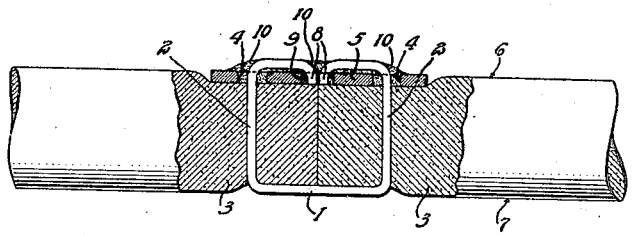
Figure 2:
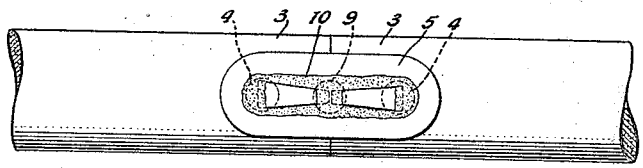
Figure 3:
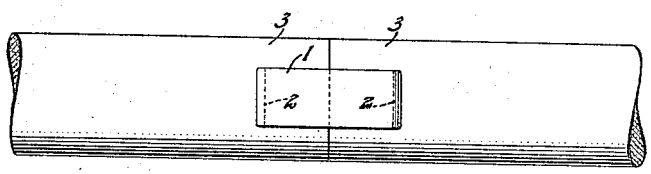
Figure 4:
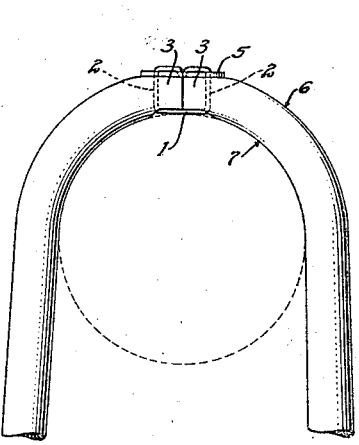
Figure 5:
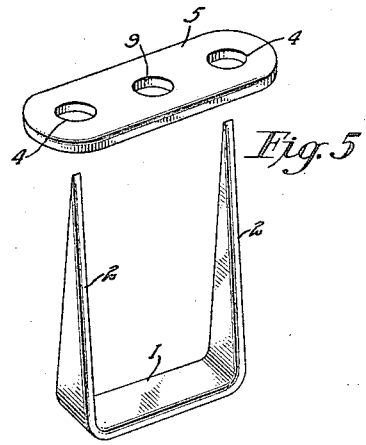

In the accompanying drawings, Fig. 1 is a longitudinal sectional view of an endless belt embodying the invention. Fig. 2 is a view of the exposed or non-pulley-contacting surface of the belt at the juncture of its ends. Fig. 3 is a similar view of the inner or driving surface of the belt. Fig. 4 is a side elevation of the belt as bent around a pulley and Fig. 5 is a disassembled perspective view of the coupling.

The device of the present improvement comprises but two parts, a U-shaped member and a holding or clinch-plate. The U-shaped member may be bent up from a metal strip, preferably from a flat sheet-metal strip, to form a connecting body 1 and legs 2 which are of substantially the same width as the body 1 at their junctures therewith and are preferably sharpened or pointed and passed transversely through the belt-ends 3, 3 and the end apertures 4, 4 in the holding or clinch-plate 5 applied to the outer or non-pulley-contacting surface 6 of the belt. The body 1 of the U-shaped member is applied to the inner or driving surface 7 of the belt and is preferably embedded in the belt ends so as to be substantially flush with the inner surface 7, as shown in Figs. 1 and 4.

The end portions of the legs 2, 2 of the U-shaped member projecting above the holding plate 5 are bent over against the exposed surface of the plate 5 and the extreme ends 8 of said legs are further bent and passed into an intermediate or central aperture 9 in the plate 5 in which aperture said ends 8 are anchored by soldering 10, substantially filling the aperture 9.

The device is particularly well adapted for joining the ends of round belting to form endless belts for driving sewing machines from motor attachments having driving pulleys of relatively small diameter, of the order of three-fourths of an inch to one inch. Since the body 1 of the U-shaped member does not extend lengthwise of the belt beyond the legs 2, 2, no resistance is offered by parts outside of the space between such legs against bending of the belt so that it may adapt itself closely to the curvature of a small pulley, as shown in Fig. 4. The holding plate 5, being on the outer or non-pulley-contacting surface 6 of the belt, does not interfere with the driving flexure of the belt.

The two parts of the coupling are of simple form and are inexpensive to manufacture, as well as being easy to apply. Endless belts embodying the coupling are found to be very strong and durable in practice; specimen belts made of high grade leather having given as much as two months continuous service. The belts also run quietly and smoothly over the pulleys; no annoying clicking sounds being in evidence.

Having thus set forth the nature of the invention, what I claim herein is:—

The combination with the meeting ends of a belt of round section, of a clinch-plate extending across the meeting line and formed with end apertures and with a central aperture, and a U-shaped member having a pair of legs and a body-portion of less width than the diameter of the belt section but of the same width as said legs at its junctures with the latter, said U-shaped member having its body-portion applied to the inner surface of the belt across the belt ends and its legs passed transversely through the respective belt ends and through the end apertures of the clinch-plate, said legs having their ends bent toward one another and passed into the central aperture in the clinch-plate and anchored by soldering to the walls of such central aperture.

In testimony whereof, I have signed my name to this specification.

FREDERICK DIEHL.